(12) United States Patent
Wooster et al.

(10) Patent No.: US 9,363,653 B2
(45) Date of Patent: Jun. 7, 2016

(54) TRANSFER OF COMMUNICATION FROM ONE DEVICE TO ANOTHER

(75) Inventors: Roland P. Wooster, Folsom, CA (US); Itamar Sharoni, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 172 days.

(21) Appl. No.: 13/997,480

(22) PCT Filed: Mar. 8, 2012

(86) PCT No.: PCT/US2012/028267
§ 371 (c)(1),
(2), (4) Date: Jun. 24, 2013

(87) PCT Pub. No.: WO2013/133836
PCT Pub. Date: Sep. 12, 2013

(65) Prior Publication Data
US 2014/0087705 A1     Mar. 27, 2014

(51) Int. Cl.
*H04M 3/42*     (2006.01)
*H04W 4/16*     (2009.01)
(Continued)

(52) U.S. Cl.
CPC ............... *H04W 4/16* (2013.01); *H04B 5/0031* (2013.01); *H04M 3/58* (2013.01); *H04W 4/008* (2013.01); *H04M 2203/5009* (2013.01); *H04W 76/02* (2013.01); *H04W 92/18* (2013.01)

(58) Field of Classification Search
CPC ........ H04L 67/42; H04W 4/02; H04W 76/02; H04W 84/12; H04W 84/18; H04W 88/02; H04W 88/04; H04W 4/008; H04W 88/06; H04W 12/08; H04W 8/005; H04W 12/06; H04W 48/18; H04W 4/023; H04W 12/00; H04W 8/22; H04M 1/0256; H04M 1/6041; H04M 1/6066; H04M 1/7253; H04M 2250/02
USPC ........................................ 455/416, 41.1, 519
See application file for complete search history.

(56) References Cited

U.S. PATENT DOCUMENTS

| 5,710,971 A | * | 1/1998 | Armbruster | .......... | H04B 7/1856 |
| | | | | | 379/35 |
| 6,405,030 B1 | * | 6/2002 | Suprunov | ............ | H04M 3/2281 |
| | | | | | 455/211 |

(Continued)

OTHER PUBLICATIONS

International Search Report and Written Opinion mailed Nov. 28, 2012 for International Application No. PCT/US2012/028267, 11 pages.

(Continued)

*Primary Examiner* — Nimesh Patel
(74) *Attorney, Agent, or Firm* — Schwabe, Williamson & Wyatt, P.C.

(57) ABSTRACT

Embodiments of apparatus, computer-implemented methods, systems, and computer-readable media are described herein for wirelessly transferring communication roles between devices, using technology such as near field communications ("NFC"), optical communication (e.g., barcodes), BlueTooth and so forth. In various embodiments, a first device may transfer, from the first device to a second device using near field communication, data used by the first device to communicate with a third device, to cause the second device to initiate communication with the third device based on the data. Likewise, in various embodiments, a first device may receive, from a second device using NFC, data used by the second device to communicate with a third device, and to initiate communication with the third device based on the received data.

12 Claims, 7 Drawing Sheets

(51) Int. Cl.
   *H04W 4/00* (2009.01)
   *H04B 5/00* (2006.01)
   *H04M 3/58* (2006.01)
   *H04W 76/02* (2009.01)
   *H04W 92/18* (2009.01)

(56) References Cited

U.S. PATENT DOCUMENTS

| | | | |
|---|---|---|---|
| 6,976,055 | B1 | 12/2005 | Shaffer et al. |
| 7,734,793 | B2 * | 6/2010 | Bowman-Amuah ... H04L 29/06027 709/204 |
| 8,340,271 | B2 * | 12/2012 | Knaz ............ H04M 3/56 370/260 |
| 2005/0101261 | A1 * | 5/2005 | Weinzweig et al. ......... 455/74.1 |
| 2006/0040692 | A1 * | 2/2006 | Anttila et al. ................ 455/519 |
| 2007/0005775 | A1 | 1/2007 | Philips |
| 2008/0192770 | A1 * | 8/2008 | Burrows et al. .............. 370/466 |
| 2010/0311401 | A1 * | 12/2010 | Oh et al. ....................... 455/417 |
| 2011/0043600 | A1 * | 2/2011 | Gopal ................ H04L 12/1881 348/14.09 |
| 2011/0150199 | A1 * | 6/2011 | Gisby et al. ............. 379/202.01 |
| 2013/0314491 | A1 * | 11/2013 | Vivekanandan et al. ... 348/14.08 |
| 2013/0342637 | A1 * | 12/2013 | Felkai et al. ............... 348/14.08 |

OTHER PUBLICATIONS

International Preliminary Report on Patentability mailed Sep. 18, 2014 for International Application No. PCT/US2012/028267, 8 pages.

* cited by examiner

TRANSFER OF COMMUNICATION FROM ONE DEVICE TO ANOTHER

CROSS REFERENCE TO RELATED APPLICATIONS

The present application is a national phase entry under 35 U.S.C. §371 of International Application No. PCT/US2012/028267, filed Mar. 8, 2012, entitled "TRANSFER OF COMMUNICATION FROM ONE DEVICE TO ANOTHER", which designated, among the various States, the United States of America. The Specification of the PCT/US2012/028267 Application is hereby incorporated by reference.

FIELD

Embodiments of the present invention relate generally to the technical field of data processing, and more particularly, to wireless data transfer to transfer communication from one device to another.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Devices may use wireless technology such as bar codes, Bluetooth and near field communication ("NFC") to communicate with each other directly when in close proximity. For instance, a mobile phone and a point-of-sale device respectively equipped with NFC components may communicate with each other to facilitate a transaction. A customer may use the mobile phone to purchase a product by placing it within a close proximity of, or even by tapping it against, the point-of-sale device, to cause a deduction of funds, equivalent to the price of the product, from the user's bank account.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be, understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
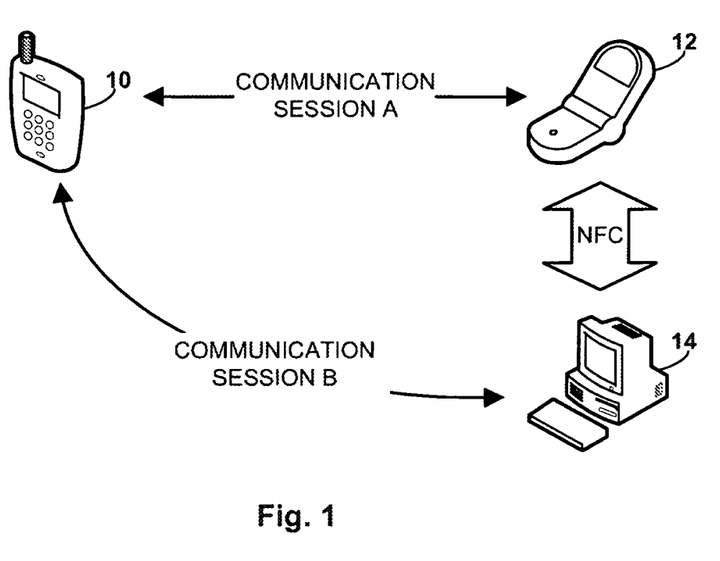
FIG. 1 schematically illustrates an example of how devices may directly transfer communication data wirelessly, in accordance with various embodiments.

Referring now to FIG. 1, a first device 10 (configured with applicable portions of the teachings of the present disclosure), shown here in the example form of a mobile phone, may participate in "Communication Session A" with a second device 12 (which may or may not be configured with any teaching of the present disclosure), shown here in the example form of a mobile phone. As used herein, the term "communication session" may refer to any exchange of data/information between two or more devices. The exchanged data may include but is not limited to voice data, text data, visual data (e.g., video, graphics), a combination of voice and visual data, commands, and so forth.

In the example of FIG. 1, Communication Session A may be a telephone call. A user (not shown) operating second device 12 may wish to transfer the telephone call to a third device 14 (also configured with applicable portions of the teaching of the present disclosure), shown here in the example form of the user's desktop computer. The user operating second device 12 may have participated in the telephone call while driving to the office, and may wish to transfer the call to third device 14 (e.g., her desktop computer) upon arrival. The user may wish to transfer the call to third device 14 for a variety of reasons, such as second device 12 having low battery, or a cellular signal in the user's office being weak.

Whatever the reason, the user may place second device 12 within close enough proximity of third device 14 in order for components (not shown in FIG. 1) on second device 12 and third device 14 to communicate directly. For example, the user may physically contact (e.g., tap) second device 12 against third device 14. Once within sufficient proximity, the devices may exchange data wirelessly, as shown by the block arrow in FIG. 1. This direct wireless exchange may be implemented using various technologies. In FIG. 1 and in a number of other examples described herein, near field communication ("NFC") may be used to directly exchange data to initiate communications with other devices. However, this is not meant to be limiting, and other types of wireless technologies, such as Bluetooth or optical technologies such as bar code scanning, may be used by devices to directly exchange data to initiate communications. For example, a transferring device may generate a bar code on a display. In various embodiments, a receiving device may read the displayed bar code and initiate communication using data contained therein.

The data directly exchanged wirelessly by devices using technology such as NFC (also referred to herein as "communication data") may include data associated with a communication session such as Communication Session A. For example, in FIG. 1, if Communication Session A occurs over a cellular network, second device 12 may directly transfer, to third device 14, communication data that includes a telephone number associated with first device 10. In various embodiments, this communication data may include other types of data, such as a passcode, any other calling numbers that may be relevant, and/or instructions for third device 14 to initiate communication with first device 10. Third device 14 may use the received communication data to initiate "Communication Session B," in the form of a telephone call with first device 10, using the received telephone number (and any other applicable data). In various embodiments, third device may take one or more predetermined pauses between various actions, e.g., if a passcode is required to initiate communication with first device 10. These pauses may be part of logic on third device 14, or they may be instructions received in communication data from second device 12.

As another example, if Communication Session A is a voice over IP ("VoIP") call, second device 12 may directly transfer, to third device 14, data that includes an Internet Protocol ("IP") address associated with the first device 10. Third device 14 may then initiate Communication Session B, e.g., in the form of a VoIP telephone call, to first device 10 using the IP address.

Communication Session B may be initiated at first device 10 in various ways. In various embodiments, "call waiting" functionality may be used to notify a user (not shown) of first device 10 that another call (Communication Session B) is being initiated. The user of the first device 10 may then accept waiting call, e.g., by pressing a "flash" button or, in some cases, a "talk" button. In various embodiments, the user of second device 12 may notify the user of first device 10 that the user of second device 12 is transferring the call to his or her desktop computer (third device 14). The user of first device 10 may then accept the incoming call (e.g., by pressing "flash" or "talk") to initiate Communication Session B. Once Communication Session B is initiated, Communication Session A may be dropped. For instance, the user of second device may terminate Communication Session A on second device 12, e.g., by pressing the "End" key or closing a flip phone.

In various embodiments, devices such as first device 10, second device 12 and third device 14 may be configured to cooperate to provide a streamlined transition from Communication Session A to Communication Session B. For example, second device 12 and/or third device 14 may be configured to transmit an indication to first device 10 that Communication Session B is being initiated as a result of the user of second device transferring a call (Communication Session A) to third device 14. Rather than requiring the user of first device 10 to initiate Communication Session B, e.g., by pressing "flash" or "talk" to accept an incoming call in call waiting, first device 10 may, upon receiving the indication from second device 12 or third device 14, automatically switch from Communication Session A to Communication Session B.

In various embodiments, second device 12 may receive, e.g., directly from third device 14 (e.g., over NFC) or from first device 10 (e.g., over other communication means), confirmation that the third device 14 successfully established communication (e.g., Communication Session B) with first device 10. In various embodiments, second device 12 may then cease communication with first device 10 upon receipt of the confirmation, e.g., by hanging up.

While the foregoing examples were described in terms of telephone calls or VoIP calls, the examples are not meant to be limiting. In various embodiments, similar techniques may be used with other types of communication sessions, such as video calls. Additionally, while FIG. 1 depicts a mobile telephones and a desktop computer acting in the various roles, the depiction is not meant to be limiting. As will be seen below in other examples, any of these devices may be other types of communication devices, such as laptop computers, office telephones, set top boxes, gaming consoles, computing tablets, and so forth.

Figure 2:
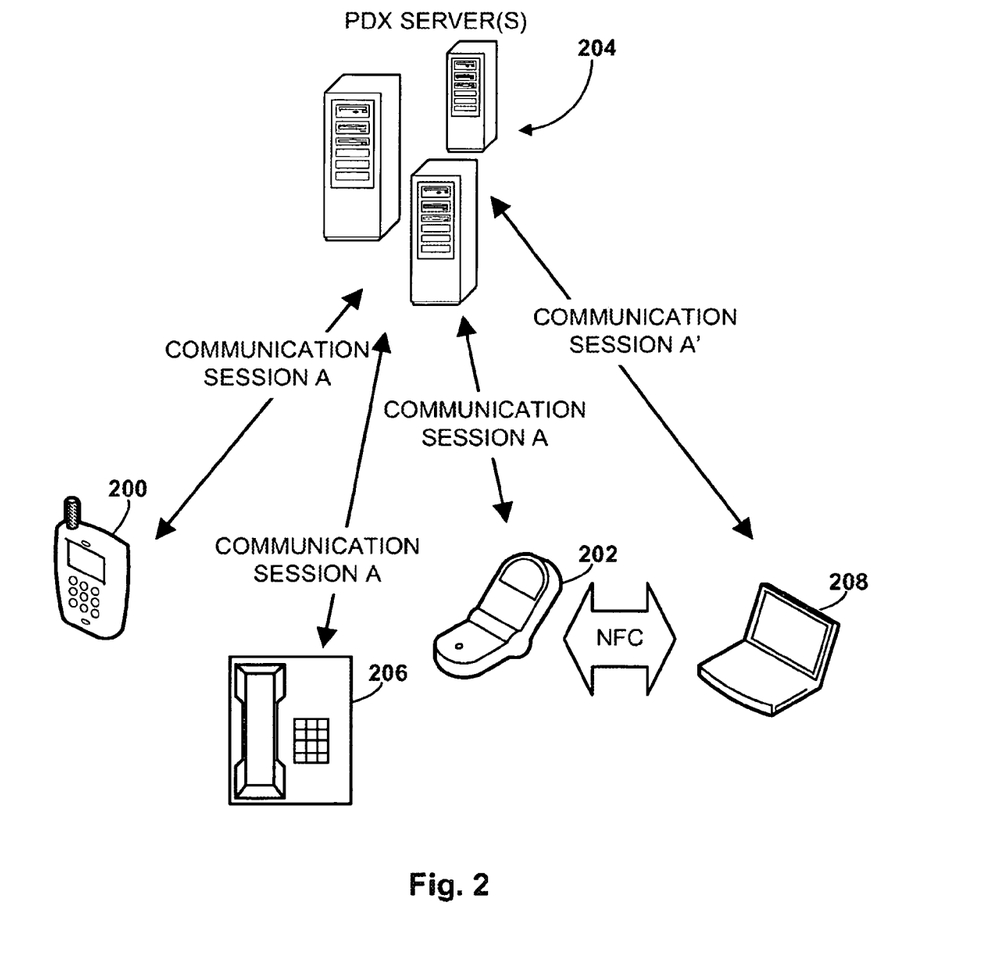
FIG. 2 schematically illustrates an example of how devices communicating through a phone data exchange ("PDX") server may exchange communication data wirelessly, in accordance with various embodiments.

In FIG. 2, a first device 200 (which may or may not be configured with any teaching of the present disclosure), shown here in the example form of a mobile phone, may be communicating with a second device 202 (configured with applicable portions of the teaching of present disclosure), shown here in the example form of a cellular telephone, via "Communication Session A." Communication Session A may be a multi-party conference call (also referred to as a "bridged call") provided by one or more phone data exchange ("PDX") servers 204 (also referred to as a "bridge"). The telephone number or IP address associated with the conference may also be referred as the "bridge number." For purposes of this disclosure, each conference call hosted by the one or more PDX servers 204 may be referred to as a separate communication session. Other devices such as a telephone 206 may also be participating in Communication Session A. PDX servers 204 and other devices 206 may or may not configured with any teaching of the present disclosure.

A user of second device 202 may wish to transfer his or her role in Communication Session A to a third device 208, shown here in the example form of a laptop computer (configured with applicable portion of the teaching of the present disclosure). Similar to above, the user may position second device 202 within a predetermined distance of third device 208, or even bring them into physical contact, e.g., by tapping second device 202 against the surface of third device 208. This may cause second device 202 to directly transfer communication data to third device 208 (e.g., using NFC or other technologies such as optical communication or BlueTooth), to enable third device 208 to join Communication Session A (shown as Communication Session A "prime" in FIG. 2 only to highlight that third device 208 joined later).

In various embodiments, the communication data transferred directly from second device 202 to third device 208 may include a telephone number associated with the one or more PDX servers 204, a bridge number associated with a particular conference call/communication session hosted by the one or more PDX servers 204 and/or a passcode required to join the conference call/communication session. Using such information, third device 208 may join Communication Session A. If the user of second device 202 is the host of the conference call, the data transferred may further include the host code.

In various embodiments, the device receiving the communication, e.g., third device 208, may be configured to join Communication Session A in various ways. In various embodiments, third device 208 may be configured to automatically provide to one or more PDX servers 204 a telephone number, bridge number and/or passcode third device 208 received from second device 202. In various embodiments, third device 208 may be configured to dial the received telephone number associated with the one or more PDX servers 204, and then pause for a predetermined amount of time. In various embodiments, the predetermined amount of time may enable one or more PDX servers 204 and third device 208 to engage in a predetermined initiation sequence that is normally used when a user uses a device to join a conference call. In various embodiments, after the pause, third device 208 may be configured to provide a bridge number received from second device 202 to the one or more PDX servers 204. In various embodiments, third device 208 may pause again for another predetermined amount of time before providing the passcode received from second device 202. In various embodiments, the pauses may be defined in logic on third device 208 (e.g., in a VoIP application), or the pauses may be defined in instructions contained in the communication data sent by second device 202 to third device 208, e.g., via NFC.

Similar to above, in various embodiments, third device 208 may directly transfer, e.g., to second device 202 using NFC, confirmation that third device 208 successfully joined Communication Session A. Likewise second device 202 may receive, e.g., from third device 208 over NFC, or in some embodiments, from the one or more PDX servers 204, confirmation that the third device 208 successfully joined Communication Session A. In various embodiments, second device 202 may cease participation in Communication Session A, e.g., by ceasing communication with the one or more PDX servers 204, upon receipt of the confirmation.

In various embodiments, the one or more PDX servers 204 may be configured to play a role in facilitating transfer of conference calls between devices. For example, the one or more PDX servers 204 may receive, e.g., from first device 200 or second device 202, a request to establish a conference call accessible by a predetermined number of callers. This predetermined number may be selected by a user of one of the devices, and may reflect a number of users/devices that are expected to join the conference call. When initiating the conference call/communication session, the one or more PDX servers 204 may automatically add one or more extra (or "ghost") callers, in addition to the predetermined number of callers. The one or more extra callers may be usable by one or more of the predetermined number of callers to directly transfer a role in the conference call/communication session from one device to another wirelessly, e.g., using NFC, optical communication or Bluetooth. Having extra callers may allow for seamless transition of participation in a conference call between devices.

For instance, in FIG. 2, Communication Session A may have been initiated for three callers, e.g., devices 200, 202 and telephone 206. Without users being aware of it, PDX servers 204 may have added one or more extra callers to Communication Session A. If none of the three initial participants transfers their role in Communication Session A to another device, then the one or more extra callers may go unused. However, if one of the users, e.g., the user of second device 202, does transfer a role in Communication Session A to another device, e.g., third device 208, then third device 208 may dial into PDX servers 204 and be assigned to a first of the one or more extra callers. Second device 202 may then hang up, and the user of second device 202 and third device 208 may experience little to no interruption.

In various embodiments, as part of the process of transferring the participation in Communication Session A, first device 202 and/or third device 208 may notify PDX servers 204 of third device 208 is joining Communication Session A in place of first device 202.

Figure 3:
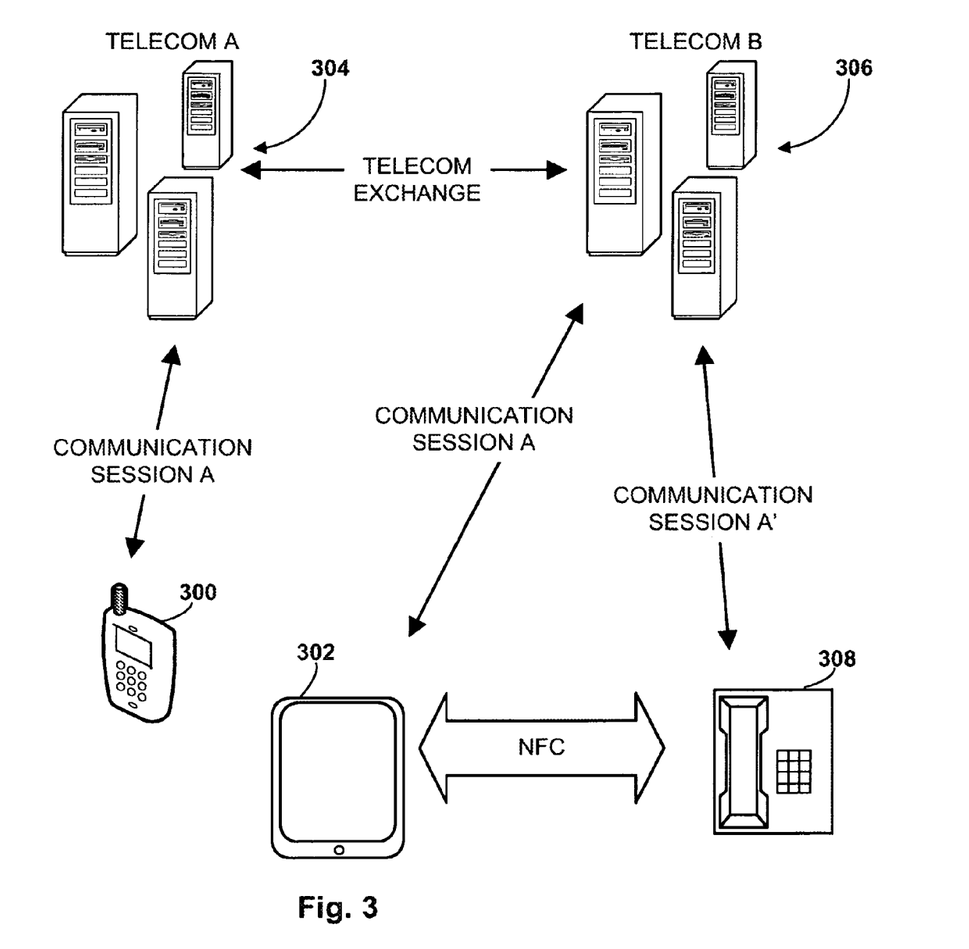
FIG. 3 schematically illustrates an example of how devices communicating through telecommunication companies ("telecoms") may directly exchange data wirelessly, in accordance with various embodiments.

Another variation is shown in FIG. 3. A first device 300 (which may or may not be configured with any teaching of the present disclosure), shown here in the example form of a mobile phone, is participating in "Communication Session A" with a second device 302 (configured with applicable portions of the teaching of the present disclosure), shown here in the example form of a tablet computer. In this example, Communication Session A is taking place over one or more cellular networks through cooperation of a provider computer system 304 of a first telecommunication company ("TELECOM A") and a provider computer system 306 of a second telecommunication company ("TELECOM B").

A user of second device 302 may wish to transfer the call from second device 302 to a third device 308 (configured with applicable portions of the teaching of the present disclosure), shown here in the form of a desktop telephone. As before, the user may position second device 302 and third device 308 within a predetermined proximity, e.g., by tapping second device 302 against third device 308. In various embodiments, this may cause second device 302 and third device 308 to exchange communication data associated with Communication Session A.

For example, second device 302 may transfer communication data associated with Communication Session A (e.g., a phone number of first device 300) to third device 308. Additionally or alternatively, third device 308 may transfer data usable to communicate with third device 308 (e.g., its telephone number) to second device 302, so that second device 302 may instruct one of the telecommunication companies to transfer the call to third device 308, as described below.

In various embodiments, one or more provider computer systems (e.g., 304, 306) (which may or may not be configured with any teaching of the present disclosure) associated with telecommunication companies, such as TELECOM A or TELECOM B in FIG. 3, may facilitate a transfer of a call between devices, e.g., using NFC. For instance, a provider computer system 306 at TELECOM B may be configured to receive an instruction to transfer a role of second device 302 in a call between first device 300 and a second device 302 to third device 308. This instruction may be received by provider computer system 306 from second device 302 and/or third device 308.

Provider computer system 306 may then facilitate transfer of the call from second device 302 to third device 308. For example, provider computer system 306 may utilize call transfer functionality to transfer a role of second device in Communication Session A to third device 308 (shown in FIG. 3 as Communication Session A "prime"). The transition may operate similarly to how call transfers operate currently. Instead of a user of a phone using controls on the phone to specify another phone (e.g., a phone in another office or conference room) to which a call is to be transferred, the user may instead simply tap the phone on the desired recipient device.

The examples of FIGS. 2-3 are not meant to be limiting, and other configurations are contemplated. Devices communicating exclusively over local and wide area computer networks (e.g., the Internet) may be configured to transfer roles in communication sessions to other devices, in a manner similar to configurations where devices communicate wholly or in part through telecoms, cellular networks or PDX servers. For example, Internet voice and/or video calling applications may be installed on mobile phones (e.g., smart phones), tablets, laptops and/or other computer systems to enable users to communicate, using voice and/or video, exclusively over the Internet. In various embodiments, the communication devices may act as clients to an intermediate server that facilitates communication between the devices. In various embodiments, a mobile phone user participating in such a call using such an application may transfer the client role of her in the communication session to a tablet computer system, or vice versa.

Figure 4:
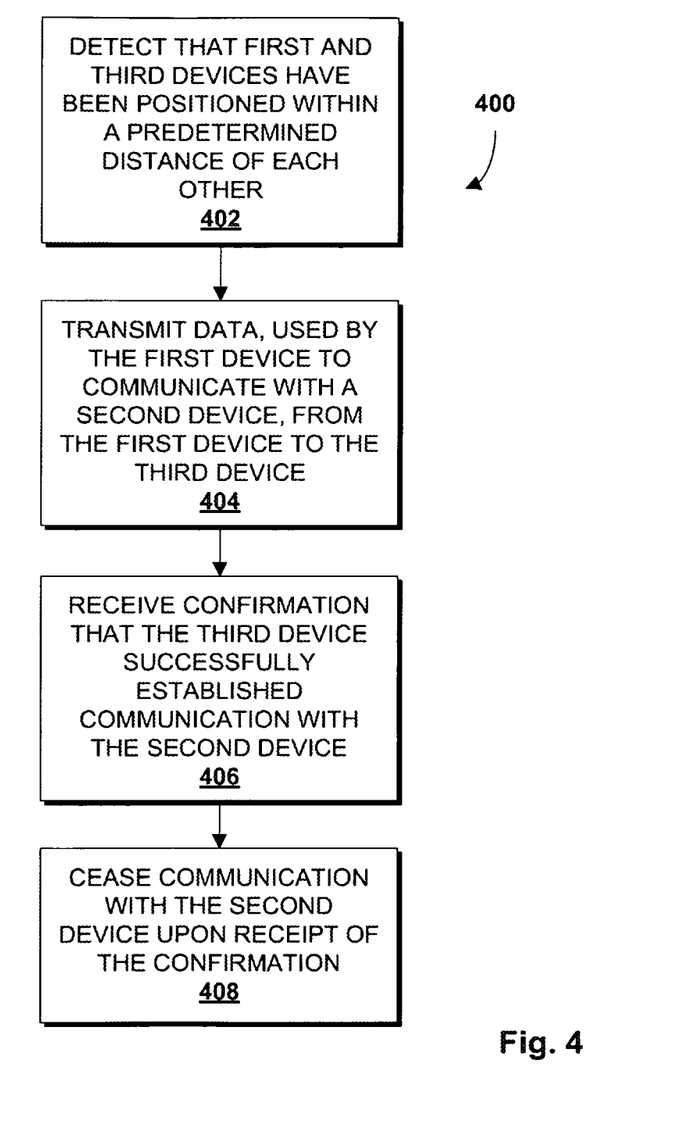
FIG. 4 schematically depicts an example method that may be implemented by a communication device, in accordance with various embodiments.

An example method 400 that may be implemented by a device such as a mobile phone, laptop computer, tablet computer system or other similar device to transfer data relating to communication is shown in FIG. 4. At block 402, a first device that is communicating with a second device may detect that it is positioned within a predetermined distance of a third device having direct wireless communication components, such as NFC components. This may be a result of the first device being placed close to, or tapped against, the third device, or this may be a result of the third device being placed close to, or tapped against, first device.

In either case, at block 404, the first device may transfer, e.g., using NFC or other suitable technology, data used by the first device to communicate with the second device, directly to the third device. The second device may be device used by another user, or it may be a PDX server. For example, the data transferred by the first device to the third device may include a PDX server telephone number, bridge number and/or a passcode that may be used to join a conference call hosted by the second device.

At block 406, the first device may receive confirmation, e.g., from the third device or another device such as a PDX server, that the third device has successfully established communication with the second device. At block 408, the first device may cease communication with the second device (e.g., exit a conference call).

Figure 5:
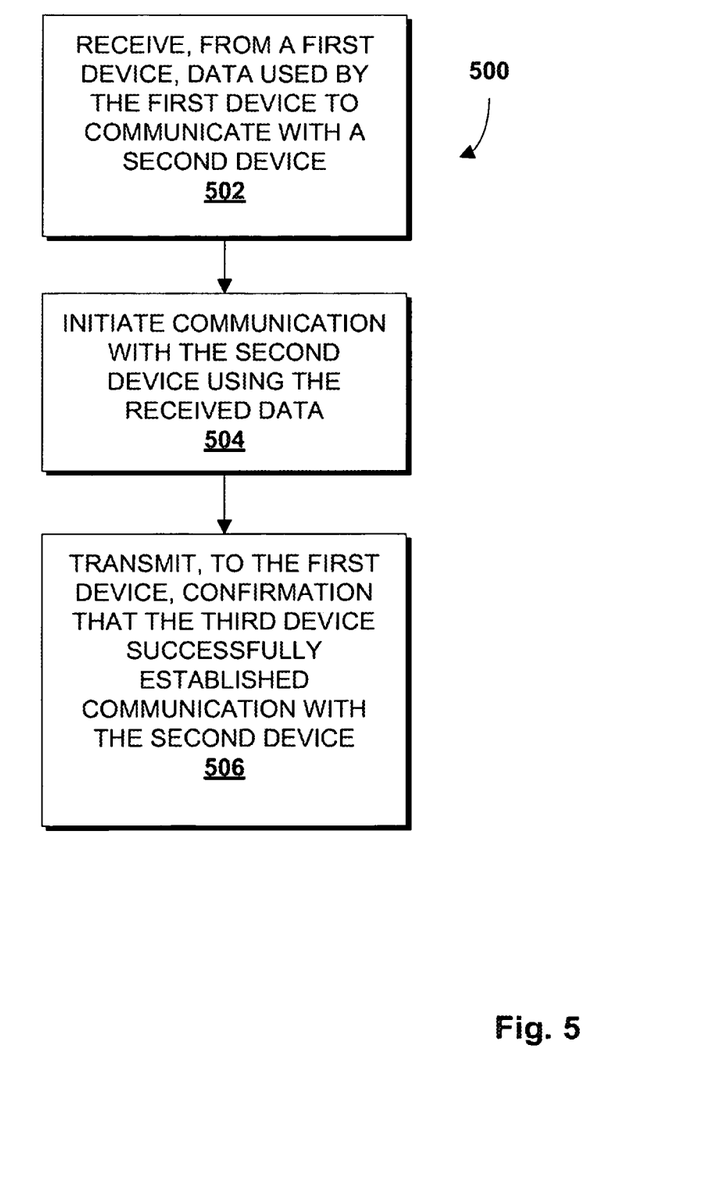
FIG. 5 schematically depicts another example method that may be implemented by a communication device, in accordance with various embodiments.

FIG. 5 depicts an example method 500 that may be implemented by a device such as the third device described with regard to FIG. 4, from the perspective of that third device. At block 502, the third device may receive data used by the first device to communicate with the second device. This may be the data sent by first device at block 402 of FIG. 4. The data may include various information, such as a PDX telephone number of the second device and other pertinent information, as described above.

At block 504, the third device may initiate communication with the second device using the received data. For instance, the third device may automatically dial into a PDX server (second device) and enter the necessary information (e.g., bridge number, passcode) and take any necessary pauses to join a conference call hosted by the second device.

At block 506, the third device may transmit, e.g., to the first device, confirmation that the third device successfully established communication with the second device. That way the first device may cease communication with the second device, e.g., as shown at block 408 of FIG. 4.

Figure 6:
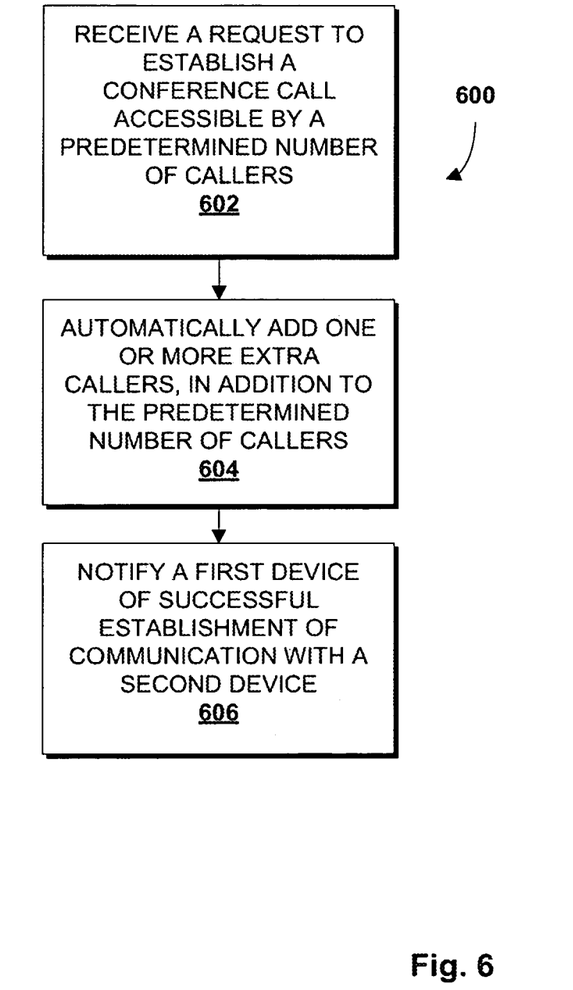
FIG. 6 schematically depicts an example method that may be implemented by a PDX server, in accordance with various embodiments.

FIG. 6 depicts an example method 600 that may be implemented on a computer system such as the one or more PDX servers 204 in FIG. 2 to facilitate transfer of calls between devices participating in a conference call. At block 602, the computer system may receive a request to establish a conference call accessible by a predetermined number of callers. For example, in FIG. 2, the one or more PDX servers 204 may receive, e.g., at some time prior to the conference call, a request to host a conference call for three callers.

At block 604, the computer system may automatically add one or more extra callers, in addition to the predetermined number of callers. The one or more extra callers may be usable by one or more of the predetermined number of callers to directly transfer a role in the conference call from one device to another, e.g., using NFC. For example, in FIG. 2, the one or more PDX servers 204 may set up a conference call for three users and automatically add one or more extra callers. When second device 202 transfers data to third device 208, e.g., using NFC, third device 208 may dial into the one or more PDX servers 204 as one of the extra callers.

At block 606, one device may be notified of successful establishment of communication with another device, so that the one device may disconnect. For example, in FIG. 2, the one or more PDX servers 204 may notify second device 202 once the one or more PDX servers 204 and third device 208 successfully establish communication with each other. At that point, second device 202 may disconnect from the one or more PDX servers 204, as the user of second device 202 may now be using third device 208.

Figure 7:
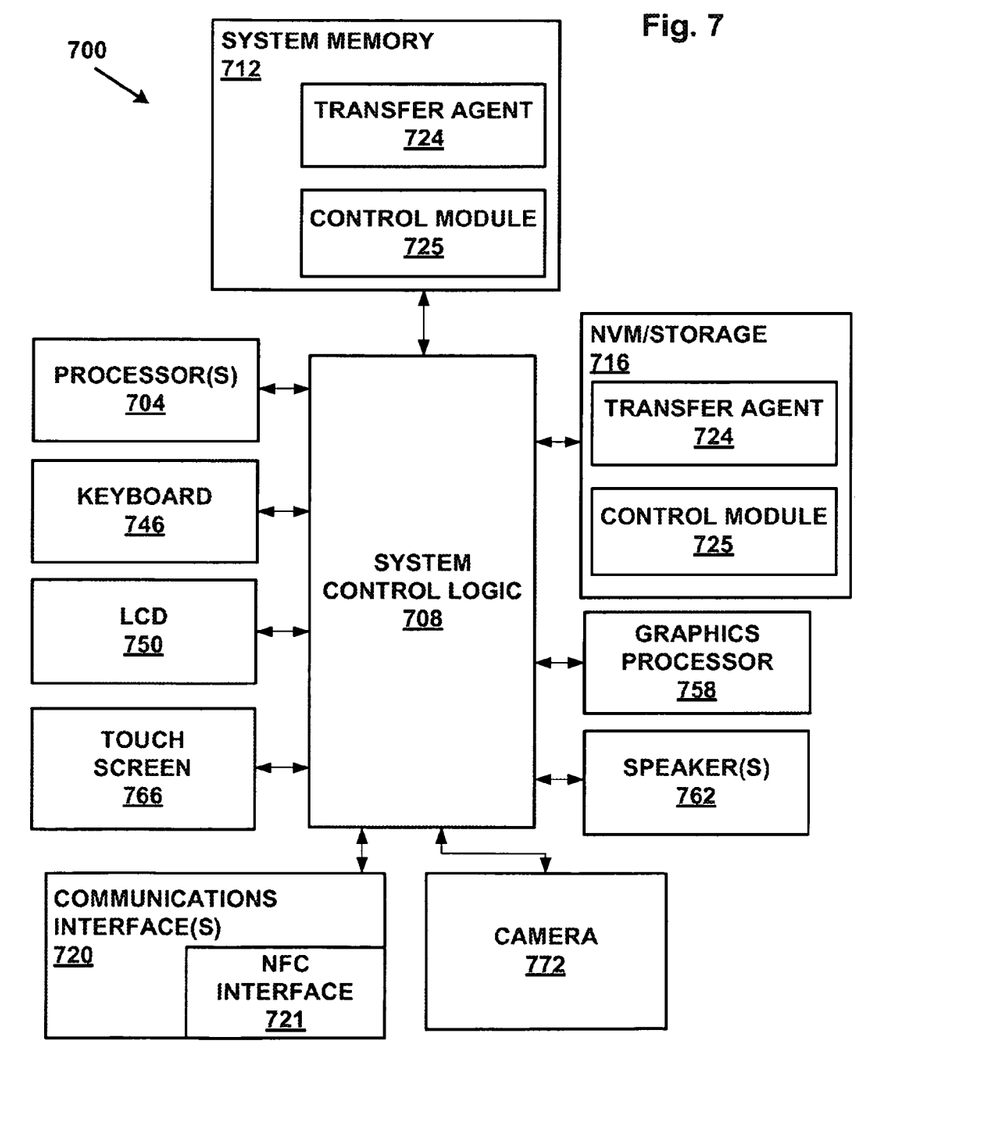
FIG. 7 schematically depicts an example system on which discloses methods and computer-readable media may be implemented, in accordance with various embodiments.

The techniques and apparatuses described herein may be implemented into a system using suitable hardware and/or software to configure as desired. FIG. 7 illustrates, for one embodiment, an example system control logic 708 coupled to at least one of the processor(s) 704, system memory 712 coupled to system control logic 708, non-volatile memory (NVM)/storage 716 coupled to system control logic 708, and one or more communications interface(s) 720 coupled to system control logic 708. In various embodiments, the one or more processors 704 may be a processor core.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory ("DRAM"), for example.

System control logic 708 for one embodiment may include one or more input/output ("I/O") controller(s) to provide an interface to NVM/storage 716 and communications interface(s) 720.

NVM/storage 716 may be used to store data and/or instructions, for example. NVM/storage 716 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 716 may include a storage resource physically part of a device on which the system 700 is installed or it may be accessible by, but not necessarily a part of, the device. For example, the NVM/storage 716 may be accessed over a network via the communications interface(s) 720.

System memory 712 and NVM/storage 716 may include, in particular, temporal and persistent copies of a transfer agent 724 and/or control module 725, respectively. The transfer agent 724 may include instructions that when executed by at least one of the processor(s) 704 result in the system 700 practicing the applicable portions of the earlier described methods of the role of a transferring device, a transferee device, or a PDX server. The control module 725 may otherwise control the device, including initiating communications with other devices after receiving data via transfer agent 724. In some embodiments, the transfer agent 724 and/or control module 725 may additionally/alternatively be located in the system control logic 708.

Communications interface(s) 720 may provide an interface for system 700 to communicate over one or more network(s) and/or with any other suitable device. Communications interface(s) 720 may include any suitable hardware and/or firmware, such as a network adapter, one or more antennas, a wireless interface, and so forth. In various embodiments, communication interface(s) 720 may include an interface 721 for system 700 to use NFC, optical communications (e.g., barcodes), BlueTooth or other similar technologies to communicate directly (e.g., without an intermediary) with another device.

In various embodiments, for transfer agent 724 configured to enable system 700 to practice the methods of a transferring device or a transferee device, transfer agent 724 may be given control or notified of the start of an NFC session by communication interface(s) 720. In various embodiments, e.g., embodiments where the NFC interface 721 may serve multiple applications operating on system 700, transfer agent 724 may be configured to register itself with the NFC interface 721 to be notified of a NFC session being initiated. In various embodiments, a notification by the NFC interface 721 may include a device type of the other device in NFC with system 700. For these embodiments, transfer agent 724 may conditionally claim the NFC session, and take control, if the other device is also a complementary communication device. For example, if system 700 is a mobile phone, transfer agent 724 may claim the NFC session, and take control, if the other device is also a call capable device (versus e.g., a non-calling device like a printer). In various embodiments, transfer agent 724 (or other components of system 700) may be configured to authenticate the other device. Transfer agent 724 (or other components of system 700) may be configured with authentication (including e.g., encryption/decryption) capabilities.

For one embodiment, at least one of the processor(s) 704 may be packaged together with system control logic 708. For one embodiment, at least one of the processor(s) 704 may be packaged together with transfer agent 724/control module 725 or system control logic 708 with transfer agent 724/control module 725 to form a System in Package ("SiP"). For one embodiment, at least one of the processor(s) 704 may be integrated on the same die with transfer agent 724/control module 725 or system control logic 708 with transfer agent 724/control module 725. For one embodiment, at least one of the processor(s) 704 may be integrated on the same die with transfer agent 724/control module 725 or system control logic 708 with transfer agent 724/control module 725 to form a System on Chip ("SoC").

The system 700 may be a desktop or laptop computer, a server computer system, a mobile telephone such as a smart phone, a tablet computer system, a set top box, a game console, a desktop telephone, a VoIP telephone, or any other device adapted to communicate with other devices. In various embodiments, system 700 may have more or less components, and/or different architectures. For example, in FIG. 7, system 700 includes a keyboard 746, a liquid crystal display ("LCD") 750, a graphics processor 758, speakers 762, a touch screen 766 (which in some cases may be the same as LCD 750), and a camera 772 that may be operated by processor(s) 704 to capture images for storage in NVM/storage 716.

The following paragraphs describe examples of various embodiments. In various embodiments, a first device may be configured to directly transfer, to a second device wirelessly, e.g., using NFC, optical communication, BlueTooth or other similar communication technology, data used by the first device to communicate with a third device, to cause the second device to initiate communication with the third device based on the data. In various embodiments, data used by the first device to communicate with the third device may include a telephone number associated with a telephone call between the first device and the third device. In various embodiments, data used by the first device to communicate with the third device may include a telephone number associated with a video call between the first device and the third device.

In various embodiments, the data transferred from the first device to the second device may include a telephone number or Internet Protocol address associated with the third device. In various embodiments, the data transferred from the first device to the second device may include one or more of a host code, a passcode or a bridge number. In various embodiments, the data transferred from the first device to the second device may include one or more predetermined pauses to be taken by the second device when the second device initiates communication with the third device.

In various embodiments, the first device may be configured to directly transfer the data to the second device wirelessly, e.g., over NFC, in response to one of the first and second devices being positioned within a predetermined distance of the other of the first and second devices. In various embodiments, the first device may be configured to directly transfer the data from the first device to the second device wirelessly, e.g., over NFC, in response to the first device and second device coming into physical contact.

In various embodiments, the first device may be configured to receive confirmation that the second device successfully established communication with the third device, and to cease communication with the third device upon receipt of the confirmation. In various embodiments, the first device may be a mobile telephone and the second device may be a desktop computer, a computing tablet, or a laptop computer.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques. For example, in various embodiments, such as those described in the immediately preceding paragraphs, the second device may be configured to directly receive, from the first device wirelessly, e.g., using NFC, the data used by the first device to communicate with a third device, and to initiate communication with the third device based on the received data.

In a related aspect, in various embodiments, a server may receive a request to establish a conference call accessible by a predetermined number of callers. In various embodiments, the server may automatically add one or more extra callers in addition to the predetermined number of callers, the one or more extra callers being usable by one or more of the predetermined number of callers to directly transfer a role in the conference call from a first device to a second device wirelessly, e.g., using NFC.

In another related aspect, a first device may be configured to detect that one of the first device and a second device has been positioned within a predetermined distance of the other of the first and second devices. In various embodiments, the first device may be configured to receive, directly from the second device wirelessly, e.g., using NFC, data usable to communicate with the second device. In various embodiments, the first device may be configured to transmit, to a provider computer system that facilitates a communication session, an instruction to transfer a role of the first device in the communication session to the second device based on the received data.

In another related aspect, a first device may be configured to detect that one of the first device and a second device has been positioned within a predetermined distance of the other of the first and second devices. In various embodiments, the first device may be configured to directly transfer, to the second device wirelessly, e.g., using NFC, data usable to communicate with the first device. In various embodiments, the second device may be configured to use the data to instruct a provider computer system that facilitates a communication session to transfer a role of the second device in the communication session to the first device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer-implemented method, comprising:
   receiving, by a server, a request from a requesting device to establish a conference call accessible by a predetermined number of callers; and
   automatically adding, by the server without instruction by the requesting device or any callers to the conference call, one or more extra callers in addition to the predetermined number of callers, the one or more extra callers being usable by one or more of the predetermined number of callers to transfer a role in the conference call directly from a first device to a second device wirelessly, wherein the one or more extra callers are added prior to initiation of participation by the second device in the conference call.

2. The computer-implemented method of claim 1, further comprising notifying, by the server, the first device of successful establishment of communication with the second device.

3. The computer-implemented method of claim 2, wherein the first device disconnects upon receipt of the notification.

4. The computer-implemented method of claim 1, wherein the role is to be transferred directly from the first device to the second device using near field communication.

5. One or more non-transitory computer readable media having instructions thereon that, in response to execution by one or more processing devices of a server, cause the server to:
   receive a request from a requesting device to establish a conference call accessible by a predetermined number of callers; and
   automatically add, without instruction by the requesting device or any callers to the conference call, one or more extra callers in addition to the predetermined number of callers, the one or more extra callers being usable by one or more of the predetermined number of callers to transfer a role in the conference call directly from a first device to a second device wirelessly, wherein the one or more extra callers are added prior to initiation of participation by the second device in the conference call.

6. The one or more non-transitory computer readable media of claim 5, wherein the instructions are further to, in response to execution by the one or more processing devices of the server, cause the server to:
   notify the first device of successful establishment of communication with the second device.

7. The one or more non-transitory computer readable media of claim 6, wherein the first device disconnects upon receipt of the notification.

8. The one or more non-transitory computer readable media of claim 5, wherein the role is to be transferred directly from the first device to the second device using near field communication.

9. A server, comprising:
   a memory; and
   one or more processors to:
      receive a request from a requesting device to establish a conference call accessible by a predetermined number of callers, and
      automatically add, without instruction by the requesting device or any callers to the conference call, one or more extra callers in addition to the predetermined number of callers, the one or more extra callers being usable by one or more of the predetermined number of callers to transfer a role in the conference call directly from a first device to a second device wirelessly, wherein the one or more extra callers are added prior to initiation of participation by the second device in the conference call.

10. The server of claim 9, wherein the one or more processors are further to:
   notify the first device of successful establishment of communication with the second device.

11. The server of claim 10, wherein the first device disconnects upon receipt of the notification.

12. The server of claim 9, wherein the role is to be transferred directly from the first device to the second device using near field communication.

* * * * *